J. C. MacLACHLAN.
PROCESS OF DESICCATING LIQUIDS.
APPLICATION FILED JULY 11, 1914.
1,258,348.
Patented Mar. 5, 1918.
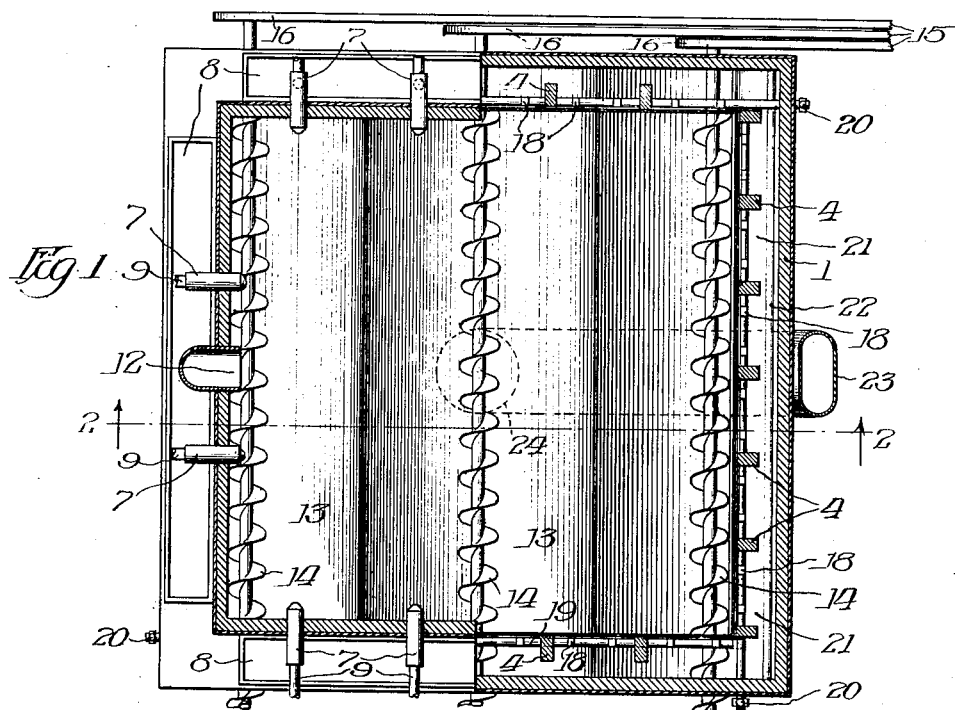
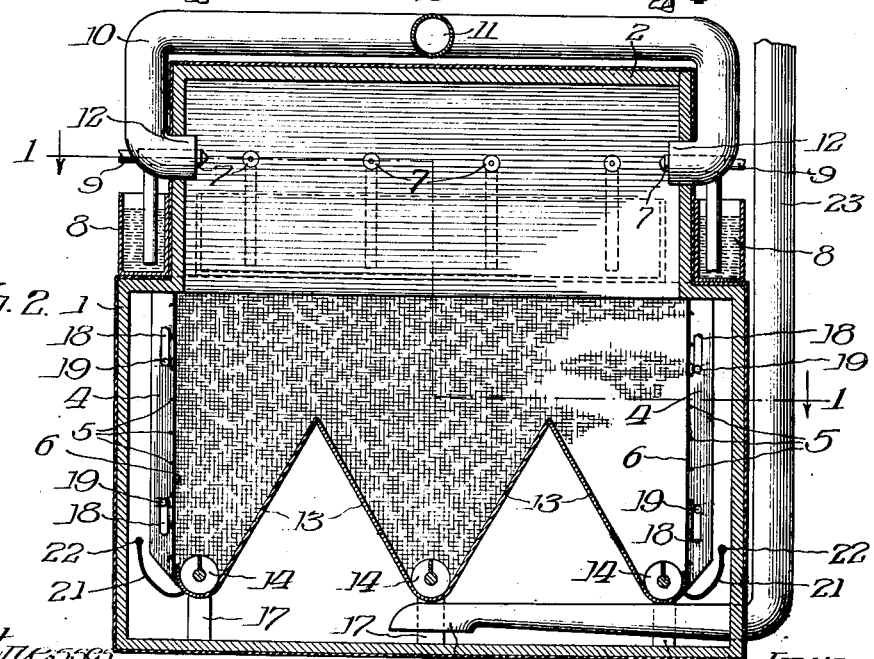
Witnesses
Inventor:
John C. MacLachlan
By Bell & Huxley
Attys

UNITED STATES PATENT OFFICE.

JOHN C. MacLACHLAN, OF CHICAGO, ILLINOIS.

PROCESS OF DESICCATING LIQUIDS.

1,258,348. Specification of Letters Patent. Patented Mar. 5, 1918.

Application filed July 11, 1914. Serial No. 850,306.

*To all whom it may concern:*

Be it known that I, JOHN C. MACLACHLAN, a citizen of the United States, residing at Chicago, in the county of Cook, and State of Illinois, have invented certain new and useful Improvements in Processes of Desiccating Liquids, of which the following is a specification.

My invention relates to an improved desiccating process applicable to the drying in powdered form of various liquids having solid constituents in suspension, particularly buttermilk, and to the product resulting therefrom. An apparatus is shown and described which is particularly adapted for carrying on my improved process, as it provides an effective means for not only desiccating the solution but in case of buttermilk it provides a means for preventing the over-heating of the liquid and resulting dried particles which would interfere with the production of the dried particles or flour or entirely prevent the production of said flour.

In the desiccation of buttermilk peculiar difficulty is experienced from the fact that it comprises cream with a large part of the butter fat removed. Coagulable matter is therefore still present in the buttermilk, and any attempt to heat the buttermilk sufficiently to evaporate the moisture and leave the solid constituents in dry form results in a coagulation of the solid constituents long before the buttermilk reaches a sufficient temperature to effectively evaporate the moisture. This coagulated mass when dried cannot successfully be reduced to powdered form that will readily mix with water when desired to again form a buttermilk solution. By my process this difficulty is entirely avoided by taking the buttermilk and first gently heating the same to such a degree only as will slightly start the coagulation, thus producing a light, flocculent mass as a precipitate, which, however, is not sufficiently coagulated to prevent readily mixing again with the watery part of the mixture if desired. After the precipitation of the light, flocculent mass, as described, the watery part of the mixture is taken off and reduced in evaporating pans, preferably of the vacuum type, until the consistency of the said watery part of the mixture is substantially that of the watery portion including the precipitated flocculent mass. The concentrated mixture in the evaporating pan is then mixed with the part of the mixture containing the flocculent matter and stirred to make an evenly distributed mixture of the solid constituents and the remaining liquid. The resulting mixture is preferably of rather thick consistency as compared with water or milk, being about the same as the consistency of thin, starchy mixture used for laundry purposes. The resulting thickened mixture is then placed in the tank connected with the atomizing devices of my apparatus and sprayed under high pressure into the desiccating or drying chamber. This desiccating chamber is supplied during the desiccating operation with large quantities of highly heated air, the temperature of which is sufficient to immediately vaporize the watery constituent of each atomized particle of the thickened mixture, thus leaving the solid constituent part of each atomized particle in a dry condition, as a result of which the dried particle falls downward under the action of gravity to the bottom of the desiccating chamber, where it is collected and removed from the apparatus by suitable devices. A novel form of screen is employed in connection with the apparatus to prevent the passage from the apparatus of any of the flour consisting of the dried atoms without interfering with the ready passage from the machine of the air delivered to the apparatus in highly heated condition.

While my process has been described above as employed in the production of buttermilk flour, it will be understood as equally applicable to the desiccation of any similar mixture; that is, any mixture having a critical temperature beyond which, if the mixture be heated, some constituent parts of the mixture coagulate or partially solidify, with the result that it is impossible to subsequently dry and grind the solid portion of the mixture and produce a flour that is soluble, whereas if the solid portions of the mixture were dried and precipitated in atomized form, the resulting product would be soluble. My product is particularly applicable to compositions of the kind just referred to in which the mixture in addition to containing solid constituents tending to coagulate by the application of heat contains also other solid constituents not affected by the application of the coagulating heat, as a result of which the remaining portion may be advantageously treated as a separate step of the process in evaporating pans, particularly if the percentage of these solid constituents is small.

The several drawings illustrating the apparatus used in connection with my invention are as follows:

Figure 1 shows the apparatus in horizontal sectional view taken along the line 1—1 of Fig. 2; and Fig. 2 shows a vertical sectional view taken along the line 2—2 of Fig. 1.

Similar numerals refer to similar parts throughout the several views.

As shown in the drawings, the apparatus consists of an inclosing casing 1, which preferably consists of a thick inner wall of insulating material, such, for example, as cork surrounded by a thinner protecting wall of stronger material, such, for example, as sheet metal. The wall 1 extends continuously on all sides of the apparatus, and the top 2 and bottom 3 of the apparatus are provided with similar inclosing walls. The lower portion of the receptacle contained within the walls 1, 2 and 3 is of greater length and breadth than the upper portion to provide for the necessary supporting devices for the screening mechanism contained within the lower part of the apparatus, as well as to provide clearance passages around the screening mechanism to permit the ready egress of the heated air from the apparatus. Within the enlargement referred to in the lower portion of the apparatus a plurality of upright supporting bars 4 is disposed, which bars extend on all four sides of the apparatus and which are preferably made of wood. These bars, however, have extending horizontally around them on their inner faces supporting wires 5, which are disposed at substantially equal distances from each other to support the fabric 6 extending around on the inner faces of the bars 4 to form the screen for permitting the heated air to pass from the apparatus without permitting the flour to pass through said screen. This screen is preferably made of canvas having a sufficiently fine weave to prevent the flour passing therethrough, without, however, preventing the passage through the fabric of the heated air. The supporting wires 5 serve to prevent the fabric from bulging outward under the pressure necessarily produced in the apparatus to force the necessary amount of air through it to properly desiccate the solution with such a rapidity as to make the apparatus effective and efficient in operation.

The upper portion of the apparatus (being that portion for which the side walls 1 are located closer together than the lower portion of the apparatus) has mounted on each of its sides a plurality of atomizers 7 supplied with the solution to be atomized from one of the tanks 8 and operated by air, either preheated or not, as desired, supplied under suitable pressure through the pipes 9. These atomizers are located preferably in the same horizontal plane as indicated, although it is not necessary that they should be so disposed.

Heated air is projected into the upper part of the casing through a pipe 10 having a supply connection 11 and two outlet openings 12 disposed opposite to each other in the side walls of the casing and located in substantially the same horizontal plane as the atomizers. While this particular disposition of the outlet openings 12 is indicated, it will be understood that other arrangements of these openings may be employed, as, for example, other numbers of discharge openings may be provided, and these openings may be disposed in different manner from that shown in the drawings. The air supplied to the pipe 10 through the opening 11 is heated to such a temperature that it will instantly dry or desiccate the atomized particles of the mixture projected into the casing by the action of the atomizers 7. To force the highly heated air into the receptacle it is desirable to employ a fan or pump, but as this does not constitute an essential part of the present invention neither this nor the heating means employed is shown and described in the present application. These devices may be found in one form in my issued Patent No. 1,038,773.

The temperature of the air delivered to the casing by the pipe 10 is determined by three factors: First, the quantity of mixture projected into the casing by the atomizers 7; second, the latent heat of the mixture; and, third, the maximum temperature that the resulting dried or desiccated atoms will stand without injury. The effect of the latent heat of evaporation of the mixture being desiccated is to cool the heated air very markedly in the zone of evaporation, as a result of which the heated air is delivered from this zone and passes to the screen at the portion of the zone where the dried or desiccated product is ready for delivery from the apparatus, and, therefore, at this point the heated air must be of no higher temperature than the dried or desiccated product can safely stand. Since the quantity of mixture to be desiccated determines the quantity of heat required to evaporate it for any given quantity of air supply to the apparatus per unit of time, the temperature will need to be greater as the quantity of mixture projected into the apparatus by the atomizers is increased, assuming that the heated air leaves the evaporating zone at a constant temperature for the particular mixture under treatment. Similarly, as the quantity of mixture projected into the apparatus by the atomizers is decreased, the temperature of the given quantity of air referred to must necessarily be decreased in order to maintain the temperature of the heated air leaving the apparatus at the constant value referred to for the mixture being treated. Proper and efficient operating conditions may therefore always be maintained by controlling the atomizers 7, which are provided with suitable controlled valves for this purpose which are not shown.

The desiccated particles resulting from the action of the apparatus descend through the apparatus in the form of very fine, light and flocculent flour upon the inclined bottom walls 13 which project upward toward the evaporating zone at acute angles to each other so as to form sharp ridges at their upper edges and so as to have a sufficient inclination to direct any of the flour falling upon them downward toward the helical conveyers 14 located at the lower edges of the walls 13 and parallel with said walls. The walls are continued around the lower surfaces of the conveyers 14 in contact with said conveyers so that the latter may operate effectively to remove the accumulated flour longitudinally of the conveyers and deliver the same from the apparatus to suitable receiving receptacles not shown, after which the flour may be packed for shipment in any desired manner. The conveyers 14 may be operated in any desired manner either by hand for small plants or by power, as indicated in Fig. 1, by means of the belts 15 extending around the pulleys 16 connected with the shafts of the conveyers. The walls 13 are supported from the bottom 3 of the apparatus by struts 17, which are provided at intervals under the conveyers 14. The edges of the walls 13 also serve to support the lower ends of the bars 4 in any suitable manner.

After continued operation of the apparatus for some time the fabric of the screen becomes more or less clogged owing to the accumulation upon it of a certain amount of the dry flour, and in order to clear the screen and at the same time save the flour a plurality of beaters 18 is provided, supported upon rods 19 extending transversely of the bars 4 and substantially parallel with the wires 5. These bars are preferably mounted on the inner edges of the bars 4 and extend through them so that the beaters 18 may be moved in semi-circles and engage the wires 5 both above and below the rods 19. As a result of the construction described, when the rods 19 are rotated by the handles 20 the wires 5 and the adjacent screen are shaken so as to jar from the screen the flour accumulated thereon. To provide against this cleaning operation being too violently accomplished as a result of which a small amount of the flour is forced through the screen and lost, I provide troughs 21, of fabric similar to the screen, below the lower edge of the screen around each of the walls of the apparatus, these troughs being supported by rods 22 extending along their upper edges. The rods 22 are disposed far enough from the inner surface of the side walls 1 so that ample clearance is left for the egress of the air which is passed through the screen, and the lower edges of the troughs are brought into contact with and may be secured to the lower edges of the outer ones of the walls 13. The troughs 21 may, if preferred, be loosely mounted so that they may be bodily removed from the apparatus for cleaning the same when desired, to accomplish which the side walls may be made wholly or in part removable. The troughs 21 being made of fabric permit the passage through them of a large quantity of the air which passes through the screen 6, and in the event of the troughs becoming clogged with the flour accumulated upon them the clearance above referred to between the rods 22 and the inner surface of the side walls 1 is ample to take care of the operation of the apparatus without any material decrease in its efficiency.

I find it desirable to provide means for sucking the air from the lower portion of the apparatus to assist in the screening operation, and to accomplish this I provide an outlet pipe 23 connected with air exhausting means of any desired type, such as a pump or fan, which pipe extends through the lower portion of one of the side walls 1 and across the bottom of the apparatus and terminates in a central downwardly extending opening 24. This construction provides for the production of a zone of sub-atmospheric pressure centrally disposed in the lower part of the apparatus, as a result of which the sides of the apparatus are affected in substantially equal degree so that the pressure of air along each side of the screen 6 is reduced substantially the same amount by the operation of the suction mechanism.

One of the advantages of the construction just described is that the screen is vertical and extends on all four sides of the apparatus substantially in the plane of the side walls of the upper portion of the apparatus, as a result of which the flour produced cannot readily accumulate in any considerable quantity upon the screen and the area of screening operation is made a maximum, with the result that the pressure exerted upon the screen by the air passing through it is correspondingly reduced, which is a desirable condition since the higher the pressure of the air upon the screen the greater is the amount of flour which is drawn through the screen by said air pressure, for it is to be understood that while it is the intention to prevent any of the flour from working through the screen this ideal condition can never be entirely accomplished, and it is necessary therefore to use every precaution to decrease this action.

It is to be borne in mind that none of the heated air passing into the apparatus leaves the same except by passing through the vertical screen 6, since the inclined walls 13 are solid, and thus the screening operation is accomplished with maximum efficiency, for where any portion of a screen is inclined so that the material screened may rest upon it to a greater or less degree, the effectiveness of the screening operation is just to that extent decreased.

By my invention above described I believe I am the first one to have produced a buttermilk flour in the form described. This product is of great use, as the demand for buttermilk for feeding stock, etc., far exceeds the supply, and when available in the form of dry flour readily soluble in water the product is at once available regardless of the distance of the user from the point of manufacture of the buttermilk, with the resulting valuable double result that the producer of the buttermilk is able to dispose of his product to advantage where now this product is largely wasted and thrown away; and, on the other hand, consumers living at such a distance from the producer as to make it impracticable to send to him the liquid buttermilk can readily be furnished with the buttermilk flour and have the same article as the original buttermilk by dissolving the flour in water. As a result of the flour being perfectly dry it will retain its fresh quality for a long time, which is a necessary consideration in producing the product in any considerable quantity and shipping it any considerable distance.

While I have described my process above as accomplished in part by the particular apparatus shown and described, I desire to have it understood that I consider my process to include as one of its steps the atomizing of the resultant thickened solution in any manner in the presence of highly heated air. I do not wish to be understood as limiting myself to the specific manipulation described above in connection with carrying out my process nor to the specific construction of apparatus described for carrying out the process to produce my new product, but on the other hand my invention includes equivalents of the operations, construction and product specifically described which are comprehended within the knowledge of the art, and my claims are to be understood as reciting and including broadly all manipulations, constructions and products falling generically within my invention in view of the present state of the art. In carrying out my process above described it will be understood that the slight coagulation of the portion of the solid matter contained in the mixture may be accomplished, if preferred, in other ways than by heating, as, for example, a small amount of suitable chemical may be added to the original solution, such, for example, as rennet in the case of buttermilk, and that the partial resulting precipitation may be used to separate the mixture into the watery portion and the relatively thicker portion so that the watery portion may be removed and subsequently reduced or condensed in the manner described.

What I claim is:

1. The process of desiccating liquids containing coagulable material consisting of slightly coagulating the coagulable matter contained therein, removing it from the liquid portion of the mixture, evaporating part of the water from said liquid portion, mixing the thus condensed liquid portion of the original liquid with the part containing the coagulum, and atomizing the resultant mixture into highly heated air.

2. The process of desiccating liquids containing coagulable material consisting of slightly coagulating the coagulable matter contained therein, removing it from the liquid portion of the mixture, evaporating part of the water from said liquid portion, mixing the thus condensed liquid portion of the original liquid with the part containing the coagulum, projecting the resultant mixture in atomized form into a receptacle, and passing highly heated air into said receptacle in contact with said atomized mixture.

3. The process of desiccating liquids containing coagulable material consisting of slightly coagulating the coagulable matter contained therein, removing it from the liquid portion of the mixture, evaporating part of the water from said liquid portion, mixing the thus condensed liquid portion of the original liquid with the part containing the coagulum, projecting the resultant mixture in atomized form into an insulated receptacle, passing highly heated air into said insulated receptacle, and separating the resultant dried solid particles from the heated air.

4. The process of desiccating solutions containing a coagulable material consisting in slightly coagulating coagulable matter contained therein, removing the watery portion of the solution, evaporating a part of the water from said watery portion, mixing the condensed watery portion of the solution with the solution containing the coagulum, and atomizing and evaporating the resultant mixture to dryness.

5. The process of desiccating buttermilk, consisting in separating the milk into two portions by coagulation, the first of said portions containing precipitated slightly coagulated solid matter in light flocculent form and the second portion consisting of water containing a small percentage of dissolved solids, separating the two portions, partially evaporating the second portion, mixing the concentrated second portion with the first portion, and atomizing and evaporating the resultant mixture to dryness.

6. The process of desiccating buttermilk, consisting in precipitating the coagulum by the application of heat, the remaining portion of the mixture consisting of water containing a small percentage of dissolved solids, separating the two portions, evaporating the second portion in an evaporating pan to practically the consistency of the coagulum, mixing the concentrated second portion with the coagulum, and atomizing the resultant mixture in the presence of highly heated air.

7. The process of desiccating buttermilk, consisting in separating the milk into two portions by coagulation, the first of said portions containing precipitated slightly coagulated matter in light flocculent form and the second portion consisting of water containing a small percentage of dissolved solids, separating the two portions, evaporating the second portion in an evaporating pan to practically the consistency of the first portion, mixing the concentrated second portion with the first portion, projecting the resultant mixture in atomized form into a receptacle, and passing highly heated air into said receptacle in contact with said atomized mixture.

8. The process of desiccating buttermilk, consisting in precipitating the coagulum by the application of heat, the remaining portion of the mixture consisting of water containing a small percentage of dissolved solids, separating the two portions, evaporating the second portion in an evaporating pan to practically the consistency of the coagulum, mixing the concentrated second portion with the coagulum, projecting the resultant mixture in atomized form into an insulated receptacle, passing highly heated air under pressure into said receptacle, separating the resultant dried solid particles from the heated air, and drawing the heated air from the receptacle by suction means.

9. The process of desiccating solutions containing a coagulable material, consisting in slightly coagulating coagulable matter contained therein, removing the watery portion of the solution, evaporating a part of the water from said watery portion in a vacuum pan, mixing the concentrated solution with the solution containing the coagulum, and atomizing and evaporating the resultant solution to dryness.

10. The process of desiccating buttermilk, consisting in precipitating the coagulum by the application of heat, the remaining portion of the mixture consisting of water containing a small percentage of dissolved solids, separating the two portions, evaporating the second portion in a vacuum pan to practically the consistency of the coagulum, mixing the concentrated second portion with the coagulum, projecting the resultant mixture in atomized form into an insulated receptacle, passing highly heated air under pressure into said receptacle, separating the resultant dried solid particles from the heated air, and drawing the heated air from the receptacle by suction means.

11. An article of manufacture comprising the solid constituents of buttermilk after the same have been first precipitated and coagulated, and thereafter atomized and dried.

In witness whereof, I hereunto subscribe my name this 1st day of July, A. D. 1914.

JOHN C. MacLACHLAN.

Witnesses:
ALBERT C. BELL,
H. C. JACOBS.